UNITED STATES PATENT OFFICE.

ALBIN VITALIS CARLSON, OF DEGERHAMN, SWEDEN, ASSIGNOR TO CARL LORENS CARLSON, OF STOCKHOLM, SWEDEN.

PROCESS FOR MANUFACTURING A HYDRAULIC CEMENT.

1,130,143. Specification of Letters Patent. Patented Mar. 2, 1915.

No Drawing. Application filed February 8, 1913. Serial No. 746,982.

*To all whom it may concern:*

Be it known that I, ALBIN VITALIS CARLSON, a citizen of the Kingdom of Sweden, residing at Degerhamn, Öland, Sweden, have invented a new and useful Improved Process for Manufacturing a Hydraulic Cement, of which the following is a specification.

This invention relates to a process for manufacturing a hydraulic cement of high quality, the manufacture being very inexpensive owing to the circumstance that the burning process otherwise necessary in manufacturing the usual Portland cement is dispensed with.

The invention consists, chiefly, in mixing together lime and finely divided dust obtained from iron making blast furnaces and consisting essentially of lime, silica and alumina.

It is well known that the gas escaping from an iron making blast furnace contains a fine dust which settles in the gas conduits and in the filters of the dry gas cleaning apparatus and so on, and which especially in the case where the gas is to be utilized as a driving medium in gas engines must be separated from the gas as completely as possible in order to prevent the gas engines from being injured by said dust. In order that the blast furnace dust may be utilized for the present purpose it should be separated from the gas in the dry way by means of dust collecting pockets in the gas conduits and by means of dry filters through which the gas is compelled to pass.

As example of blast furnace dust separated in the dry way the following statements obtained in a German blast furnace plant by taking out such dust at different points of the path of the gas passing from the blast furnace to the gas motor may be given: 1. Dust collected close to the blast furnace: The weight of 1 liter of such dust was 1140 grams and such dust could be shaken together manually to 0.24 liter. It gave a remainder of 44% on a sieve having 900 meshes per sq. cm. and a remainder of 91% on a sieve having 5000 meshes per sq. cm. This dust contained iron particles. 2. Dust collected in the gas conduit close in front of the filter of a gas cleaning apparatus in which the gas was cleaned in the dry way before it was supplied to the gas motor: 1 liter of such dust had a weight of 660 grams and could be shaken together manually to 0.63 liter. It gave a remainder of 1% on a sieve having 900 meshes per sq. cm. and a remainder of 40% on a sieve having 5000 meshes per sq. cm. 3. Dust collected in the filter of the gas cleaning apparatus: 1 liter of said dust had a weight of 210 grams and could be shaken together manually to 0.6 liter. It was extremely fine.

Though all of the blast furnace dust can be utilized for the present purpose, it is suitable before the utilization to separate the coarser and heavier particles for instance by having them settle in dust collecting pockets and to use only the finest dust which is separated by the filters of the gas cleaning apparatus, the strength of the cement thereby being improved. The burnt lime used may be slaked or unslaked. It is, however, preferred to use slaked lime in a dry state, inasmuch as in such case the pulverization of the lime is obviated. The blast furnace dust and the lime may be mixed together manually or by means of arbitrary mixing apparatus, for instance rotating mixing drums, ball mills or other grinding machines. It is suitable first to mix together the lime and a small quantity of the dust and then to add so much dust that the desired properties of the product are reached. The best results have been reached in using about 10–30 parts of weight of fine dust and 90–70 parts of weight of slaked lime, but it will be understood that the proportion between the ingredients may be varied above said limits according to the strength of the cement required. In using 30% of blast furnace dust and 70% of slaked lime a cement has been obtained that mixed with normal sand in the proportion 1:3 had a compressive strength of 209 kg. per sq. cm. after a setting time of 8 days and 224 kg. per sq. cm. after a setting time of 28 days.

The theoretic explanation of the above described capacity of the blast furnace dust to form together with lime a hydraulic cement may possibly be this that said dust contains large quantities of silica and alumina soluble in diluted hydrochloric acid and diluted solutions of soda, said silicic acid and alumina easily reacting with the lime during the setting process. In examinations of blast furnace dust taken from the filters of a dry gas cleaning apparatus there has been found about 30% of soluble silicic acid and about 20% of alumina.

Instead of mixing the blast furnace dust with usual burnt lime one may mix it with hydraulic lime, such mixture having a strength that is much greater than that of the usual hydraulic lime alone. An addition of up to 30% by weight of blast furnace dust has proved itself to be suitable, and by the addition of 20-30% by weight an increase of the strength of 20-30% has been stated. The explanation of this effect may be this that hydraulic lime contains a considerable quantity of lime that is otherwise inactive but by the addition of blast furnace dust can be caused to react with the latter during the setting process and thereby to increase the strength of the cement.

Having now described my invention what I claim as new and desire to secure by Letters Patent is:

1. The process of manufacturing hydraulic cement, which consists in mixing together lime and finely divided dust obtained from iron-making blast furnaces and consisting essentially of lime, silica and alumina, substantially as and for the purpose set forth.

2. The process of manufacturing hydraulic cement, which consists in mixing lime with iron-making blast furnace dust consisting essentially of lime, silica and alumina and collected in a dry gas cleaning apparatus, substantially as and for the purpose set forth.

In testimony that I claim the foregoing as my invention, I have signed my name in presence of two subscribing witnesses.

ALBIN VITALIS CARLSON.

Witnesses:
 OLOF SWENSON,
 S. BREMER.